3,822,281
PROCESS FOR THE PRODUCTION OF N-CARBOXY ANHYDRIDES OF GLUTAMIC ACID-γ-ESTERS
Yasuo Fujimoto, Keizo Tatsukawa, and Masayuki Teranishi, Machida, and Yoichi Koiwa, Tokyo, Japan, assignors to Kyowa Hakko Kogyo Co., Ltd., Tokyo, Japan
No Drawing. Continuation-in-part of abandoned application Ser. No. 762,617, Sept. 25, 1968. This application Jan. 4, 1972, Ser. No. 215,431
Claims priority, application Japan, Oct. 6, 1967, 42/64,006
Int. Cl. C07d 85/34
U.S. Cl. 260—307 B          9 Claims

ABSTRACT OF THE DISCLOSURE

A process for the preparation of N-carboxy anhydrides a glutamic acid-γ-esters having the general formula:

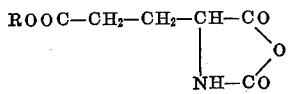

wherein R is an ester residue, which comprises suspending a glutamic acid-γ-ester in a mixed solvent consisting essentially of an aromatic hydrocarbon component and an ether component and reacting with phosgene at an elevated temperature. The products can be polymerized to useful polyglutamic acid-γ-esters.

---

This application is a continuation-in-part of abandoned application Ser. No. 762,617 filed on Sept. 25, 1968.

This invention relates to a process for producing N-carboxy anhydrides of glutamic acid-γ-esters. More particularly, it relates to a process for the production of N-carboxy anhydrides of glutamic acid-γ-esters having the following formula:

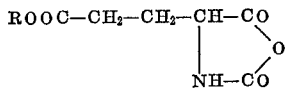

wherein R represents an ester residue, by reaction between phosgene and γ-esters of glutamic acid having the following general formula:

ROOC—CH₂— H₂—CHCOOH
              |
              NH₂ wherein R represents an ester residue. In the following description N-carboxy anhydrides of glutamic acid-γ-esters will be referred to as G-NCA and simple N-carboxy anhydrides will be referred to as NCA.

As is well known in the art, G-NCA readily polymerizes with the release of carbon dioxide into polyglutamic acid-γ-esters in suitable solvents (for example, halogenated hydrocarbons such as dichloromethane, dichloroethane, trichloroethane and chloroform, esters such as ethyl acetate, ethers such as dioxane or mixtures thereof) and in the presence of suitable initiators (for example, organic bases such as diethylamine and triethylamine), as indicated by the following reaction scheme:

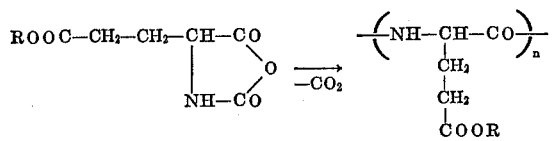

The resultant polymers are considered to be model substances of protein and, furthermore, they are known to be useful materials for producing synthetic fibers and synthetic leathers.

However, in the polymerization reaction, it is necessary that the starting materials be free of impurities, such as halogen containing compounds, in order to obtain polyglutamic acid esters having a high degree of polymerization and a high quality [Journal of the American Chemical Society, Volume 76, p. 4492 (1954)]. Therefore, it has been usually tried to recrystallize G-NCA several times [Noguchi et al., Institute of Textile Science, Annual Report No. 17, p. 30 (1964)].

Heretofore, it has been considered as being preferable to synthesize N-carboxy anhydrides of glutamic acid-γ-esters by suspending the γ-esters in a solvent such as dioxane, benzene or toluene to sufficiently dissolve the N-carboxy anhydrides and then reacting with phosgene at a low temperature (about 30°–40° C.) [Synthetic polypeptides, Academic Press Inc., New York, p. 31 (1956) and Farthing, Journal of the Chemical Society, p. 3213 (1950)].

This reaction is shown by the following scheme [see Advances in Protein Chemistry, Academic Press Inc., New York, Volume 8, p. 268 (1958)]:

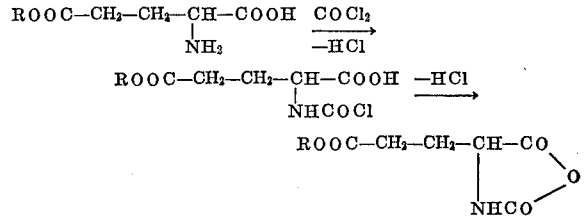

However, when the G-NCA synthesis reaction is carried out using aromatic hydrocarbons, such as benzene and toluene, as a solvent, considerably large amounts of colored substances or tarry substances are usually produced as by-products, and furthermore, it is fairly difficult to obtain G-NCA of high purity even after repeated recrystallizations. This is the reason why this method has not been more widely applied for the synthesis of G-NCA, in spite of the fact that the aromatic hydrocarbons, such as benzene and toluene, are readily available inexpensive materials and that the use thereof in the reaction system does not cause corrosion of the reaction appartus used.

On the other hand, in order to produce G–NCA in ether solvents, such as dioxane, it becomes necessary to remove a major proportion of the solvent by distillation under reduced pressure in order to separate the G–NCA after the phosgenation, because of the high solubility of G–NCA in the solvent. According to this method, it is impossible to precipitate the crystals only by cooling or by the addition of a poor solvent for G–NCA such as petroleum ether, though it is possible to get the crystals only by the cooling or by the addition of a poor solvent in the case of using halogenated hydrocarbon-type solvents for G–NCA synthesis. Moreover, removal of only the solvent by distillation results in a sirupy residue and requires complicated steps, for example, addition of dry ether to the sirupy residue, removal of the ether by redistillation and trituration with dry petroleum ether. [Journal of Polymer Science, part A–2, 4, 183 (1966)]. In addition, this operation does not always result in the precipitation of the crystals because the precipitation itself is a delicate step. In some instances, the crystalline precipitate is obtained only after standing the solution for a few days at 0° C. This has been the great bottleneck for the industrial application of the method. A further drawback of this method is that large amounts of colored substances are produced as a result of side reactions and, in order to avoid such side reactions, a special operation is required such as, for example, reducing the amino acid ester to a size of several microns and charging the same in such a manner that it will react with an equimolar amount of phosgene intermittently and instantaneously (U.S. Pat. 2,993,053). This latter method is extremely difficult to control industrially.

Accordingly, one of the objects of the present invention is to provide an improved process for the preparation of N-carboxy anhydrides of glutamic acid-γ-esters which overcomes the disadvantages and deficiencies of the prior art methods.

Another object of the present invention is to provide a process for producing said compounds (G–NCA) which may be carried out in an efficacious manner.

A further object of the invention is to provide a process for preparing N-carboxy anhydrides of glutamic acid-γ-esters which may be carried out advantageously on an industrial scale to give a high yield of product.

A still further object of the invention is to provide N-carboxy anhydrides of glutamic acid-γ-esters.

These and other objects and advantages of the present invention will become aparent to those skilled in the art from a consideration of the following specification and claims.

As a result of various studies by the present inventors on the synthesis of G–NCA by using as a solvent aromatic hydrocarbons, such as benzene and toluene, and ethers, such as dioxane, it has been surprisingly found in accordance with the present invention that the aforementioned drawbacks encountered in the synthesis of G–NCA using the aforesaid solvents independently can be eliminated entirely by carrying out the synthesis in a mixed solvent comprising an aromatic hydrocarbon component and 40% or less by volume of an ether component. In particular it has been found that the ether component may be from 2.5 to 40% by volume of the mixed solvent and especially from 2.5 to 6.7% by volume of the mixed solvent. Furthermore, it has been found that the mixed solvent has remarkable advantages which have not been described for or shown by the conventional solvents.

For example, when the synthesis of G–NCA is carried out in the mixed solvents indicated in Table 1, marked improvements are observed with respect to yield, amount of halogen-containing by-products and reaction time.

hydrocarbon or mixture thereof and 40% or less by volume of ether or mixture thereof and, after heating the suspension to a temperature of 50° C. or higher, phosgene is introduced until the reaction solution becomes transparent. Alternatively, the starting material is added to the mixed solvent which contains phosgene in an amount normally 1 to 4 times the molar amount of the ester, and the mixture is heated to a temperature of 50° C. or higher, whereupon the suspended glutamic acid-γ-ester is dissolved in the mixed solvent. The reaction solution becomes transparent usually in about 50 to 90 minutes. After the material has been dissolved, the reaction mixture is refluxed for about 10 to 60 minutes to complete the reaction. Then, excess phosgene is removed (and the insoluble substances are separated by filtration if such are present), and the resultant transparent reaction solution is cooled, thereby precipitating G–NCA of high purity. In this connection, a poor solvent for G–NCA, for example, petroleum ether or an aliphatic hydrocarbon, may of course be added to the reaction solution. It is also possible to obtain a much greater amount of G–NCA from the reaction solution by concentrating the solvent under reduced pressure. Furthermore, the phosgene remaining in the reaction solution may be removed by passing an inert gas, such as nitrogen, carbon dioxide or air, through said reaction solution after completion of the reaction but before crystallization.

The G–NA thus obtained contains very small amounts of halogens (normally only about 0.01 to 0.07% by weight), but if necessary, the G-NCA may be recrystallyzed by conventional methods and, thereby, G-NCA containing substantially no halogens can be obtained.

The reaction is usually carried out at 50° C. or higher and it is preferable to complete the reaction in as short a period of time as possible because decomposition and side reactions take place vigorously when the reaction temperature becomes higher than the melting point (or decomposition point) of the desired G-NCA.

As the γ-ester of glutamic acid employed in the present invention, either an optically active or an optically inactive γ-ester of glutamic acid can be used. Furthermore, if the ester residue or group is not decomposed by phosgene

TABLE 1

| Glutamic acid ester | Aromatic solvent | Etheric solvent | Yield of crude crystals, percent | Reaction time, min. | Chlorine contained in crude crystals (percent by weight) |
|---|---|---|---|---|---|
| 40 g | Benzene, 800 cc | Dioxane, 0 | 55 | 180 | 0.193 |
| 40 g | Benzene, 780 cc | Dioxane, 20 cc | 94 | 63 | 0.03 |
| 40 g | Toluene, 750 cc | Dioxane, 0 | 47 | 210 | 0.185 |
| 40 g | Toluene, 710 cc | Dioxane, 40 cc | 93 | 75 | 0.02 |
| 40 g | Xylene, 750 cc | Tetrahydrofuran, 0 | 43 | 195 | 0.213 |
| 40 g | Xylene, 730 cc | Tetrahydrofuran, 20 cc | 92 | 65 | 0.04 |
| 40 g | Xylene, 800 cc | Tetrahydrofurna, 0 | 56 | 185 | 0.187 |
| 40 g | 760 cc | Tetrahydrofurna, 40 cc | 93 | 75 | 0.01 |
| 40 g | {Benzene, 500 cc / Toluene, 360 cc} | Dioxane, 40 cc | 95 | 60 | 0.01 |

As can be seen from Table 1, the reaction carried out in the mixed solvents containing as little as 2.5% by volume of an ether proceeds substantially quantitatively with a minimum of side reactions. G–NCA of extremely high purity can be obtained thereby. By polymerizing the G–NCA thus obtained in a suitable solvent using an organic base as an initiator, a viscous, clear, high quality polymer solution can be obtained. The present invention thus makes it possible to use, for the synthesis of G–NCA, an aromatic hydrocarbon-type solvent which is readily available at a cheap price, which is not as corrosive as is a mixed solvent consisting of or primarily consisting of halogenated hydrocarbons and which will produce effects superior to the conventional solvents. The invention is hence of great industrial significance.

Describing the present invention briefly, a glutamic acid-γ-ester is suspended in a mixed solvent of aromatic during the reaction or the ester residue does not have any active substituent group which would react with phosgene, any ester group derived from an aliphatic-, alicyclic- or an aromatic alcohol can be employed. Usually, the use of the methyl, ethyl, n-propyl, isopropyl, n-butyl, sec-butyl, tert-butyl, i-butyl, n-amyl (n-pentyl), isoamyl, sec-amyl, tert-amyl, act-amyl (2-methylbutyl), diethylmethyl, n-hexyl, 4-methyl-2-pentyl, 1-ethylbutyl, 2-ethylbutyl, n-heptyl, diisopropylmethyl, n-octyl, 2-ethylhexyl, diisobutylmethyl, lauryl, myristyl, cetyl, cyclobutyl, cyclopentyl, cyclohexyl, methylcyclohexyl, cyclohexylmethyl, allyl, crotyl, methallyl, piperonyl, methoxyethyl, ethoxyethyl, butoxyethyl, propoxyethyl, methoxypropyl, ethoxypropyl, butoxypropyl, propoxypropyl, chloroethyl, 2-chloropropyl, 3-chloropropyl, 2-chloroisopropyl, furfuryl, tetrahydrofurfuryl, phenyl, methoxyphenyl (o-, or p-), nitrophenyl (o-, m-, or p-), chlorophenyl (o-, m-, or p-), polychlorophenyl (dichlorophenyl, trichlorophenyl, tetrachlorophenyl, or pentachlorophenyl), benzyl, methoxybenzyl, nitrobenzyl, chlorobenzyl, polychlorobenzyl, phenylethyl, cinnamyl, tolyl, tolylmethyl, diphenylmethyl, triphenylmethyl, menthyl, and cresyl (o-, m- or p-) or the like ester is preferred because of the commercial advantage thereof. Thus, it will be appreciated that the preferred groups contain from 1 to 16 carbon atoms. In general, glutamic acid-γ-esters having from 1 to 22 carbon atoms in the ester group thereof can be used.

The ethers used as solvents in the present invention may be aliphatic, aromatic, O-containing heterocyclic or alicyclic, as long as their boiling points are 50° C. or higher and they will not interfere with the phosgenating reaction. These inert ethers include, for example, isopropyl ether, n-propyl ether, ethyl n-butyl ether, isobutyl ether, n-butyl ether, isoamyl ether, dioxolane, dioxane (1,3 and 1,4), chloromethyl ether, chloromethyl ethyl ether, dichloro methyl ether, β-chlorethyl ether, dichloroethyl ether, ethylene glycol diethyl ether, ethylene glycol dimethyl ether, propylene glycol dimethyl ether, propylene glycol diethyl ether, benzyl methyl ether, benzyl ethyl ether, anisole, o-cresyl methyl ether, m-cresyl methyl ether, p-cresyl methyl ether, phenetole, tetrahydropyran, furan, tetrahydrofuran, and mixtures of the above-mentioned ethers. Generally suitable ethers contain from 4 to 24 carbon atoms.

Aromatic hydrocarbons which may be employed in the mixed solvent include, for example, benzene, toluene, xylene (o-, m- or p-), mesitylene, ethylbenzene, diethylbenzene, n-propylbenzene, cumene, cymene, solvent naphtha, coal-tar naphtha, aromatic spirits, and mixtures of the above-mentioned compounds of the benzene series. Generally these benzene ring containing solvents have from 6 to 10 carbon atoms.

The reaction is generally carried out with heating at a temperature of about 50° C. to the temperature of reflux of the solvent. However, if the temperature employed is above 100° C., the reaction time should be shortened as much as possible in order to avoid decomposition of the G-NCA. The resultant crude G-NCA usually contains 0.05% by weight or less of halogen containing impurities.

Of course, it is possible to add inert organic solvents, for example, aliphatic hydrocarbons, as diluents to said reaction mixed solvent of aromatic hydrocarbons and ethers.

A clear polymer solution containing glutamic acid γ-ester unit having a high degree of polymerization can be obtained by a polymerization reaction in the presence of an initiator for polymerization such as organic bases in a suitable solvent, for example, dioxane, ethyl acetate, dichloromethane, chloroform, dichloroethane, trichloroethane, tetrachloroethane, dichloroethylene, trichloroethylene or the like.

The following Examples are given merely as illustrative of the present invention and are not to be considered as limiting. Benzene, toluene and xylene are used therein as being representative of aromatic hydrocarbons in the mixed solvent and dioxane, tetrahydrofuran and ethylene glycol diethyl ether are used as representative of the ethers. However, it is to be understood, as noted above, that the present invention is not restricted to the use of these particular aromatic hydrocarbons or ethers, and a similar method can be conducted with other aromatic hydrocarbons or ethers. Unless otherwise noted, the percentages therein and throughout the application are by weight.

EXAMPLE 1

40 Grams of γ-methyl-L-glutamic acid is suspended in a mixed solvent consisting of 780 cc. of benzene and 20 cc. of dioxane and phosgene is passed through the resultant mixture for 63 minutes at 75° C. to obtain a clear solution. After refluxing for 15 minutes, the clear solution is filtered and the filtrate is concentrated and then 43.5 g. (94% of the theoretical yield) of crude γ-methyl-L-glutamic acid-NCA is obtained.

m.p.: 97°–98.5° C.
Halogen content: 0.03%

EXAMPLE 2

40 Grams of γ-methyl-L-glutamic acid is suspended in a mixed solvent consisting of 760 cc. of benzene and 40 cc. of tetrahydrofuran and phosgene is passed through the resultant mixture for 75 minutes at 73° C. to obtain a clear solution. After refluxing for 10 minutes, the clear solution is filtered and the filtrate is concentrated, whereupon 43.2 g. (93% of the theoretical yield) of crude γ-methyl-L-glutamic acid-NCA is obtained.

m.p.: 97°–98° C.
Halogen content: 0.01%

EXAMPLE 3

40 Grams of γ-methyl-L-glutamic acid is suspended in a mixed solvent consisting of 730 cc. of xylene and 20 cc. of tetrahydrofuran, to which a solution of 99 g. of phosgene in 50 cc. of xylene is added with stirring at 75° C. After the reaction solution becomes clear, the reaction solution is further heated and refluxed for about 10 minutes. By concentrating the reaction solution, crude crystals of γ-methyl-1-glutamic acid-NCA are obtained. The yield is 42.8 g. (92% of the theoretical yield).

m.p.: 97°–98° C.
Halogen content: 0.04%

EXAMPLE 4

40 Grams of γ-methyl-L-glutamic acid is suspended in a mixed solvent consisting of 710 cc. of toluene and 40 cc. of dioxane, and phosgene is passed through the reaction solution for 75 minutes at 70° C. to obtain a clear solution. After refluxing for about 10 minutes, the clear solution is filtered and the filtrate is concentrated, whereupon 43.1 g. (93% of the theoretical yield) of crude γ-methyl-L-glutamic acid-NCA is obtained.

m.p.: 96.5–97.5° C.
Halogen content: 0.02%

EXAMPLE 5

40 Grams of γ-methyl-L-glutamic acid is suspended in a mixed solvent consisting of 770 cc. of benzene and 30 cc. of ethylene glycol diethyl ether, and phosgene is passed through the reaction mixture for 85 minutes at 82° to 84° C. to obtain a clear solution. After refluxing for about 15 minutes, the clear solution is filtered and the filtrate is cooled, whereupon 43.1 g. (93% of the theoretical yield) of crude γ-methyl-L-glutamic acid-NCA is obtained.

m.p.: 97°–98.5° C.
Halogen content: 0.03%

EXAMPLE 6

40 Grams of γ-benzyl-L-glutamic acid is suspended in a mixed solvent consisting of 760 cc. of benzene and 40 cc. of dioxane, and phosgene is passed through the reaction mixture for 60 minutes at 70° to 75° C. to obtain a clear solution. After refluxing for 10 minutes, the clear solution is filtered and the filtrate is concentrated, whereupon 40.5 g. (91% of the theoretical yield) of crude γ-benzyl-L-glutamic acid-NCA is obtained.

m.p.: 95°–96° C.
Halogen content: 0.02%

EXAMPLE 7

When the reaction is effected similarly as described in Example 5, except for using 500 cc. of benzene, 250 cc. of toluene and 50 cc. of tetrahydrofuran as the mixed solvent, 42.5 g. of crude γ-methyl-L-glutamic acid-NCA is obtained.

m.p.: 97°–98° C.
Halogen content: 0.02%

EXAMPLE 8

When the reaction is effected similarly as described in Example 5, except for using 500 cc. of benzene, 300 cc. of toluene, 60 cc. of tetrahydrofuran and 100 cc. of Mitsubishi "Super sol 800" (trade name for a normally liquid petroleum solvent manufactured by Mitsubishi Oil Company, Limited, which has the following composition: aromatic hydrocarbons 3.5 volume percent, olefins 1.5 volume percent, paraffinic and naphthenic hydrocarbons 96.3 volume percent,) [100 cc.] as the mixed solvent, 43.0 g. of crude γ-methyl-L-glutamic acid-NCA is obtained.

m.p.: 97°–98° C.
Halogen content: 0.03% m.p.: 97°–98° C.
Halogen content: 0.03%

EXAMPLE 9

When the reaction is effected similarly as described in Example 5, except for using 500 cc. of benzene, 300 cc. of Shell "SBPX6" (trade name for a normally liquid petroleum solvent manufactured by the Shell Chemical Company having the following composition: aromatic hydrocarbons 70 volume percent, others 30 volume percent, with a boiling point of 95–132° C.) and 50 cc. of tetrahydrofuran as the mixed solvent, 43.2 g. of crude γ-methyl-L-glutamic acid-NCA is obtained.

m.p.: 97°–98° C.
Halogen content: 0.03%

EXAMPLE 10

By following the procedures described in Example 1, a series of experiments were carried out with the indicated mixtures of aromatic hydrocarbon solvent and ether solvent with reaction temperature and times as shown in the following table:

|  | Amount of glutamic acid-ω-methyl ester (gr.) | Aromatic hydrocarbon solvent (ml.) | Ether solvent (ml.) | Reaction temp (° C.) | Reaction time (min.) | Yield (percent) | Amount of Cl (percent) |
|---|---|---|---|---|---|---|---|
| (1) | 40 | Benzene (400) | Dioxane (400) | 73 | 65 | 80 | 0.09 |
| (2) | 40 | Benzene (500) | Dioxane (300) | 73 | 65 | 88 | 0.07 |
| (3) | 40 | Toluene (500) | do | 75 | 75 | 87 | 0.07 |
| (4) | 40 | do | Dioxane (320) | 75 | 75 | 87 | 0.07 |

From the above data it will be observed that when the content of the ether is 50% by volume the yield of product is 80%; whereas when the content of ether is 37.5 or 40% by volume, the yields of product are 87% and higher with the Cl content being reduced.

The invention being thus described, it will be obvious that the same may be varied in many ways. Such variations are not to be regarded as a departure from the spirit and scope of the invention, and all such modifications are intended to be included within the scope of the following claims.

We claim:

1. A process for the preparation of N-carboxy anhydrides of glutamic acid-γ-esters which comprises suspending a glutamic acid-γ-ester having the general formula:

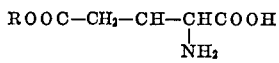

wherein R is a saturated or unsaturated aliphatic, alicyclic or aromatic radical containing from 1 to 16 carbon atoms, in a mixed solvent consisting essentially of an inert liquid aromatic hydrocarbon selected from the group consisting of benzene, toluene, o-xylene, m-xylene, p-xylene, ethylbenzene, diethylbenzene, mesitylene, n-propyl benzene, cumene, cymene, and mixtures thereof, and about 2.5% to 40% by volume of an inert ether selected from the group consisting of: isopropyl ether, n-propyl ether, ethyl n-butyl ether, isobutyl ether, n-butyl ether, isoamyl ether, dioxolane, dioxane (1,3- and 1,4-), ethylene glycol diethyl ether, ethylene glycol dimethyl ether, propylene glycol dimethyl ether, propylene glycol diethyl ether, benzyl methyl ether, benzyl ethyl ether, anisole, o-cresyl methyl ether, m-cresyl methyl ether, p-cresyl methyl ether, phenetole, tetrahydropyran, furan and tetrahydrofuran and mixtures thereof, and reacting with phosgene at a temperature from 50° C. to the reflux temperature of the solvent.

2. The process of claim 1, further comprising the step of recovering the resultant N-carboxy anhydride from the reaction mixture.

3. The process of claim 1, wherein the concentration of ether in said mixed solvent is about 2.5% to 6.7% by volume.

4. The process of claim 1, wherein said glutamic acid-γ-ester is the methyl ester of glutamic acid.

5. The process of claim 1, wherein the glutamic acid-γ-ester is the benzyl ester of glutamic acid.

6. The process of claim 1, wherein R is a radical selected from the group consisting of methyl, ethyl, n-propyl, isopropyl, n-butyl, sec-butyl, tert-butyl, i-butyl, n-amyl(n-pentyl), isoamyl, sec-amyl, tert-amyl, act-amyl (2-methylbutyl), diethylmethyl, n-hexyl, 4-methyl-2-pentyl, 1-ethylbutyl, 2-ethylbutyl, n-heptyl, diisopropylmethyl, n-octyl, 2-ethylhexyl, diisobutylmethyl, lauryl, myristyl, cetyl, cyclobutyl, cyclopentyl, cyclohexyl, methylcyclohexyl, cclohexylmethyl, allyl, crotyl, methallyl, piperonyl, methoxyethyl, ethoxyethyl, butoxyethyl, propoxyethyl, methoxypropyl, ethoxypropyl, butoxypropyl, propoxypropyl, chloroethyl, 2-chloropropyl, 3-chloropropyl, 2-chloroisopropyl, furfuryl, tetrahydrofurfuryl, phenyl, methoxyphenyl (o-, or p-), nitrophenyl (o-, m-, or p-), chlorophenyl (o-, m-, or p-), polychlorophenyl (dichlorophenyl, trichlorophenyl, tetrachlorophenyl, or pentachlorophenyl), benzyl, methoxybenzyl, nitrobenzyl, chlorobenzyl, polychlorobenzyl, phenylethyl, cinnamyl, tolyl, tolylmethyl, diphenylmethyl, triphenylmethyl, menthyl, and cresyl (o-, m- or p-).

7. The process of claim 6 wherein said inert ether is dioxane.

8. The process of claim 6, wherein the inert ether is tetrahydrofuran.

9. The process of claim 6, wherein the inert ether is ethylene glycol diethyl ether.

References Cited
UNITED STATES PATENTS 2,662,084  12/1953  MacDonald _____ 260—307
2,716,647  8/1955  Richardson _____ 260—307

DONALD G. DAUS, Primary Examiner

R. V. RUSH, Assistant Examiner